E. CAMERON.
MILKING MACHINE.
APPLICATION FILED OCT. 21, 1913.
1,164,256.
Patented Dec. 14, 1915.
2 SHEETS—SHEET 1.
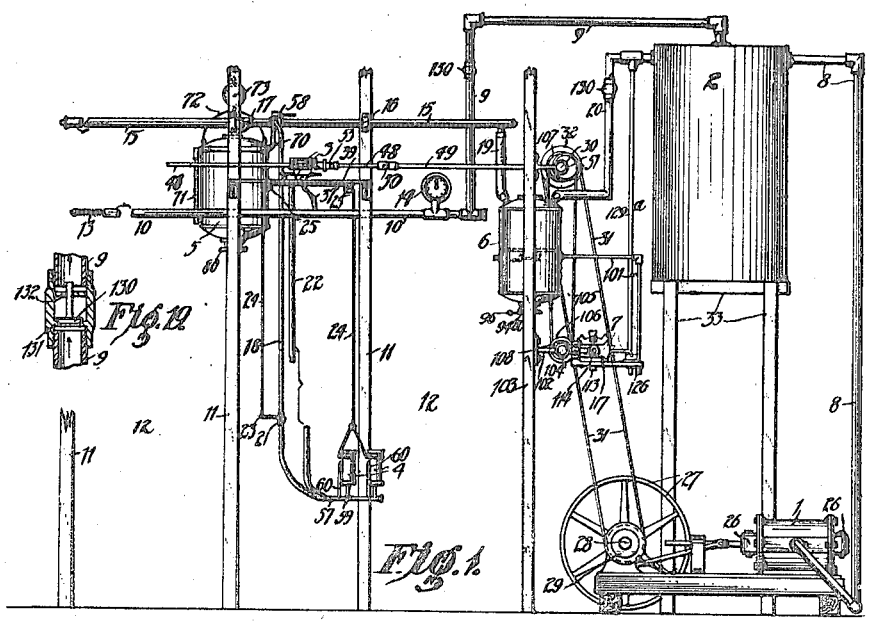
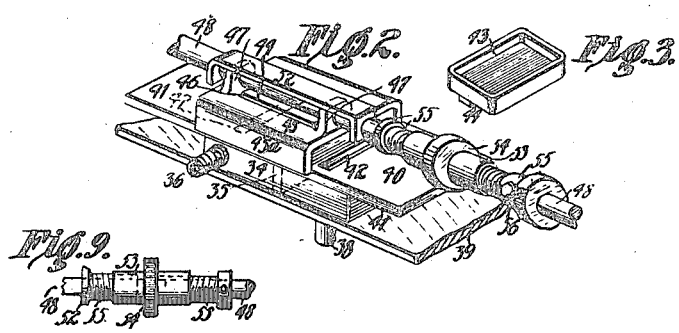

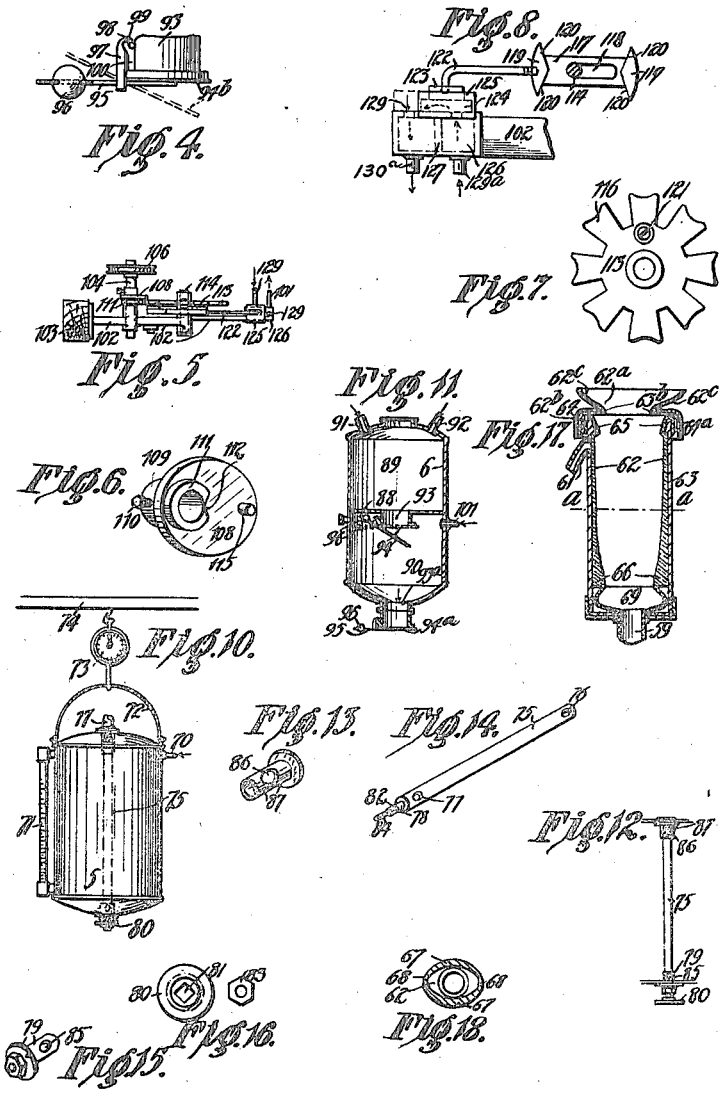

UNITED STATES PATENT OFFICE.

EDWARD CAMERON, OF MELBOURNE, VICTORIA, AUSTRALIA.

MILKING-MACHINE.

1,164,256. Specification of Letters Patent. Patented Dec. 14, 1915.

Application filed October 21, 1913. Serial No. 796,399.

*To all whom it may concern:*

Be it known that I, EDWARD CAMERON, a citizen of the Commonwealth of Australia, residing at Finks Buildings, Elizabeth Street, Melbourne, in the State of Victoria, Commonwealth of Australia, have invented certain new and useful Improvements in and Relating to Milking-Machines, of which the following is a specification, reference being had therein to the accompanying drawings.

This invention has been devised in order to provide a thoroughly reliable and efficient milking machine constructed on the conduit or overhead pipe system wherein easy access is obtained to all parts, so insuring cleanliness and obviating the necessity of using buckets, the amount of labor being thereby reduced to a minimum.

In order that the invention may be more readily understood it will now be described with reference to the accompanying drawings, in which—

Figure 1 is a front elevation of an improved milking machine fitted to a double stall and constructed according to this invention. Fig. 2 is a perspective view of the pulsator. Fig. 3 is a perspective view of an essential detail of the pulsator. Fig. 4 is a side elevation of one of the flap valves embodied in the milk receiver. Fig. 5 is a plan of the intermittent gear adapted to control the delivery of the milk from the receiver. Fig. 6 is a perspective view, and Fig. 7 is a side elevation of essential details in the intermittent gear. Fig. 8 is a side elevation of a portion of the intermittent gear illustrated in Fig. 5. Fig. 9 is a side elevation of the means employed for regulating the pulsation to suit each cow. Fig. 10 is a side elevation of the milk weighing and measuring device constructed according to this invention. Fig. 11 is a vertical central section of a milk receiver constructed according to this invention. Fig. 12 is a side elevation of the regulating device or valve mechanism controlling the delivery of the milk from the milk weighing and measuring device. Figs. 13, 14 and 15 are perspective views illustrating various parts of the regulating device or valve mechanism controlling the milk weighing and measuring device. Fig. 16 is a view in plan of constructional details embodied in the device illustrated in Fig. 12. Fig. 17 is a vertical central section of a teat cup. Fig. 18 is a sectional view taken on the line *a—a* of the teat cup lining or inflation tube illustrated in Fig. 17. Fig. 19 is a vertical central section of the valve to prevent the milk gases or vapors returning to the milk pipes, vacuum pipes and teat cups of the machine.

Like reference numerals indicate the same or corresponding parts in all the figures.

Throughout the specification, the term "vacuum" means a reduction of air pressure.

The vacuum pump 1 is connected to the reservoir 2 by means of a pipe connection 8, while the pipe 9 connects the reservoir with the main vacuum pipe 10 arranged horizontally in brackets upon the vertical supports 11 dividing the double stalls 12, any suitable number of stalls being provided. The outer end of the said vacuum pipe, which, with the main milk pipe 15, extends the length of the cow shed, is provided with a relief valve 13. A vacuum gage 14 is also fitted to the vacuum pipe.

The main milk pipe 15 is mounted in brackets 16 fitted to the supports 11 and is provided with a connection 17 leading to the milk weighing and measuring device 5 illustrated in Figs. 1 and 10.

18 is the milk pipe leading from the claw 57 carrying the teat cups 4 to the two-way valve 58; 70 is a pipe connection between the milk weighing and measuring device and the two-way valve 58, and 19 is a flexible connection between the main milk pipe 15 and the receiver 6 and through which the milk is fed to the said receiver as illustrated in Fig. 1.

The vacuum reservoir 2 communicates with the milk receiver 6 by means of the pipe 20.

The automatic cut off device for the teat cups 4 consists of a valve 21 fitted to the milk pipe 18 leading to the teat cup claw 57 from the two-way valve 58, the outer end of the handle or lever 23 of the said valve 21 being attached to a flexible connection 24 passing around pulleys 25 suspended from bracket 39 and connecting at its opposite end with the teat cups or claw as desired. By this means, should a cup fall off the teat by accident or otherwise, the milking of the cow will be automatically stopped and no atmospheric pressure is lost which would lessen the efficiency of the cups upon the other cows.

The vacuum pump 1 consists preferably of a horizontal double acting pump provided with vertical valves 26 positioned outside the cylinder heads and the pump is operated from any convenient source of power through the medium of a pulley 27 on the crank shaft 28 provided with a pulley 29 adapted to operate the counter shaft 30 by means of the belt 31 and pulley 32.

The vacuum reservoir 2 is mounted upon suitable supports 33 and as above described the exhaust by the vacuum pump is by means of the pipe connection 8.

A pulsator 3 is provided for each double stall and consists of a casing or chamber 34 divided into two compartments by means of a partition 35. The casing 34 is provided with an orifice 36 leading from one compartment and connected with the vacuum pipe 10 by means of a pipe connection 37 and is further provided with an outlet orifice 38 in the other compartment communicating through the pipe 22 with the claw 57 carrying the teat cups 4.

The pulsator is mounted on a bracket 39 fitted to the vertical supports or division posts 11 of the stalls. The upper face 40 of the pulsator chamber 34 is flat, and is provided at either end with an extended shelf 41 to permit of the dome 43 traveling thereon.

Each compartment of the pulsator 3 is provided with an orifice or slot 42 formed on the upper face of the compartment. A hollow box or dome 43 having an upwardly projecting ledge 44, is adapted to slide to and fro over the orifices 42 of the compartments of the pulsator 34. The orifice of the chamber 34 receiving the vacuum supply is always inclosed by the dome 43 and this portion of the pulsator 3 is in a constant vacuum. On the said pulsator being operated, the dome 43 intermitently covers the slot 42 formed in the outlet chamber of the pulsator.

A guide cover 45 provided with a slot 46 through which the ledge 44 of the dome 43 projects, is adapted to encircle or cover the dome 43. This guide cover is provided with flanges 45ª projecting below the shelf edge of the pulsator and on either side thereof to maintain the chamber in alinement therewith. This guide cover 45 is provided with upwardly projecting lugs or ears 47 at either end thereof adapted to receive a connecting rod 48. This connecting rod 48 extends the length of the cow shed or to the last pulsator of the series and is operated from the counter shaft 30 by means of the connecting rod 49 jointed at 50 to the rod 48 and reciprocated by an eccentric disk or wheel 51 mounted upon the counter shaft 30. This allows the dome 43 to intermittently close and open the orifice 42 in the delivery compartment of the pulsator 3.

A U shaped bridge piece 52 projects above the cover 45, the ends of the bridge projecting downwardly on either side of the lugs or ears 47 of the cover 45. This bridge 52 slides upon the rod 48 as illustrated in Fig. 2.

The sleeve or sleeve nut 53 is provided with a milled flange 54 and is adapted to connect or engage on either side with collars 55 upon the rod 48. One of the collars 55 is formed with a left handed screw thread and the other is formed with a right handed screw thread, the sleeve nut being correspondingly threaded as illustrated in Fig. 9 of the accompanying drawings.

One of the collars 55 is locked to the rod 48 by a set screw 56, while the other collar is formed upon the bridge 52. By manipulating the sleeve nut 53, the adjustment of the pulsation to suit each individual cow can be easily effected. For instance, a pulsation of more or less intensity is imparted to the teat according to the adjustment of the bridge piece 52 above the dome 43. If the bridge is adjusted centrally over the dome an equal pause is given to the pulsator during the squeezing of the teat and the atmospheric breakdown. Should one end of the bridge 52 be adjusted by the sleeve nut 53 nearer the dome than its other end, then the pause given to the pulsator during the squeezing action or the atmospheric breakdown, as the case may be, is correspondingly greater or longer than the other owing to the one end of the bridge having a shorter stroke or travel to reach and operate the dome 43, as will be readily understood.

The pipe 22 leads from the delivery chamber of the pulsator 34 and connects with a claw 57 provided with four pairs of connections having the teat cups mounted thereon. The claw 57 is also connected with the milk pipe 18 which extends upwardly to the valve 58 mounted upon the milk pipe 15 as hereinafter described. Each pair of connections of the teat cups consists of a nozzle or milk connection 59 to receive the milk, and a vacuum connection 60 through which air is intermittently supplied through the nozzle 61 to the teat cup between the case and the flexible lining 62 thereof.

The teat cup 63 consists of the usual casing and is provided with a flexible teat cup lining or inflation tube 62. This teat cup lining is provided with a flange 64 at its upper end adapted to pass around the top and seat within a groove 64ª formed in the teat cup 63. The lining is formed with a tapering neck 65 and internally tapers downwardly to the lower end 66 where it is of greater thickness than any other portion thereof. A metal cover 63ᵇ is adapted to fit over the top of the teat cup to retain the flexible lining 62 in position. The wall of the teat cup lining or inflation tube 62 is of greater thickness on two oppositely faced sides 67 than at the other portions 68 thereof.

The lower end of the inflation tube 62 is provided with an auxiliary compartment 69 adapted to act at its greatest diameter as a hinge to allow of a downward motion being imparted to the whole body of the inflation tube at nearly the same time as the squeezing motion takes place owing to the spaces between the teat cup casing and the lining 62 being alternately filled and emptied or partly emptied of air. The inflation tube 62, being thicker at its lower end than at the top, allows of a natural squeezing action to take place and the lower compartment 69 allows of a downward motion, thus causing the milk to flow freely as will be readily understood.

In order to prevent any injury to the udder of the cow, a cap of rubber or other flexible material is detachably fitted to the top of the teat cup. This flexible cap 62ª is provided with a flange 62ᵇ adapted to pass around the metal cover 63ᵇ of the teat cup. The cap is formed with an outwardly extending flared mouth 62ᶜ and is formed centrally with an orifice to allow the teat to pass within the cup. The flared mouth of the cap, during the milking operation, rests against the udder around the base of the teat and owing to its flexibility, tends to cause the milk to flow freely without straining or injuring the udder and teat during the pulsation.

The milk is withdrawn from the teat cups through the claw 57 and pipe 18, either direct to the milk pipe 15 and thence into the receiver 6 or according to the regulation of the two way valve 58 deflected into the milk weighing and measuring device 5 through the pipe connection 70. This milk weighing and measuring device consists of an outer casing 5 provided with an outer gage 71 suitably graded to register or indicate the quantity of milk within the casing. The device is provided with a handle 72 suspended from a spring balance or scales 73 or any other weight indicator, suitably mounted on a suitable support 74 above the stalls or bails. The casing or cylinder 5 is closed at both ends, the upper end being provided with a milk delivery connection 17 adapted to deliver the milk into the main milk pipe 15. After milking each cow, the milk in the cylinder 5 is delivered to the milk receiver 6 through the pipe 17 and the main milk pipe 15, the quantity of milk from the cow having been previously indicated by the gage 71 and the weight by the spring balance 73.

The regulator or valve for delivering the milk from the chamber 5 to the milk receiver 6 consists of a vertical tube 75 centrally disposed in the cylinder 5 and provided with orifices or ports 76 and 77 at the ends thereof and in line with each other. This tube is open at the top where it communicates with pipe 17 and closed at its lower end where it is provided with a vertical extension or spindle 78 adapted to pass through a flanged sleeve 79 extending upwardly through the bottom of the casing 5. This rod or spindle 78 also receives a disk 80 provided with a squared opening 81 adapted to fit around the squared end 82 of the rod 78, the whole being clamped together by a nut 83 fitting around a screw threaded extension 84 of the rod 78.

The flanged sleeve 79 is provided with an orifice 85 corresponding to the orifice formed in the lower end of the tube 75, but, while the chamber 5 is filling, this sleeve closes the orifice 77 at the lower end of the tube 75. When in the filling position, the orifice 86 on a flanged sleeve 87 projecting centrally and downwardly within the upper end of the chamber 5 and around the upper end of the tube 75 is in line with the orifice 76 in the tube 75, the vacuum supply being thereby adapted to communicate with the chamber 5.

Immediately the milking of the cow is finished, the movable disk 80 carrying the tube 75 is rotated a quarter turn to a point indicated on the flange of the sleeve 79, thereby closing the orifice 76 in the upper sleeve and opening the orifice in the lower sleeve, the vacuum being always constant in the chamber 5. The milk immediately passes through the tube 75 into the main milk pipe 15 and into the upper portion of the milk receiver 6.

The tube 75 and the sleeves 79, 87, are detachably arranged as above described, the upper sleeve being clipped or clamped to the top of the casing by suitable fastening devices.

The milk receiver 6 consists of a closed cylinder divided by a partition 88 into two compartments 89 and 90. The upper compartment 89 is provided with a milk inlet orifice 91 and a vacuum orifice 92, the said compartment 89 being constantly in vacuum. The receiver 6 is provided with a horizontal partition 88 in the center of which is an orifice 93 provided with a downwardly-opening flap valve 94 by means of which said orifice can be opened and closed. The lower end of the compartment 90 is provided with an opening 93ª through which the milk is delivered from the receiver, said opening being kept normally closed by a similar flap valve 94ª. These flap valves each consist of a disk or plate 94ᵇ provided with a rod 95 (see Fig. 4) carrying a weight 96 adjustably mounted thereon. Each flap valve is suspended upon a bracket 97 provided with a transverse pin 98 working within a groove 99 defined by lugs or ears 100 formed upon the mouths of the orifices 93 and 93ª of the compartments 89 and 90.

A pipe connection 101 connects the upper end of the lower compartment 90 with the intermittent gear 7 by means of which air is alternately admitted to or cut off from the compartment 90. The air delivered to compartment 90 closes valve 94 after the milk has been delivered to said compartment 90. The weight of the milk in said compartment 90 plus the air supplied to said compartment then opens the valve 94ª and permits the milk to flow to a bucket or other receptacle placed ready to receive it. On the air being exhausted from compartment 90, valve 94ª closes.

In operation, the milk is drawn into the upper chamber and collects therein owing to the air in the lower compartment holding the upper flap valve closed by atmospheric pressure. The intermittent gear draws the air from the lower chamber, and, with the outside air pressure, holds the bottom valve in its closed position. The upper valve is then opened by the weight of the milk above it which then flows into the lower chamber. When the air again flows into the bottom chamber, the upper flap valve is closed and the lower one opened by the weight of the milk. This action is continued throughout the milking operation.

The means for imparting an intermittent vacuum break-down to the lower compartment 90 consists of the intermittent gear 7 mounted upon a bracket 102 fitted to the vertical support 103 of the stall. This bracket has a spindle 104 mounted thereon which is driven from the counter shaft 30 by means of a belt 105 and pulleys 106 and 107.

The spindle 104 is provided with an eccentric 108, the sleeve 109 of which is mounted on the spindle 104 by means of the set screw 110.

The inner face of the eccentric is formed with a cam sleeve 111 provided with a curved groove 112 in order to provide sufficient clearance to prevent the cam coming into contact with the toothed wheel or spider 113 when the latter is rotated. This toother wheel or spider 113 is mounted upon a spindle 114 on the bracket 112 to the front of and in line with the spindle 104, the wheel or spider 113 being actuated by means of a projection 115 on the eccentric 108 gearing with or passing between the teeth 116 of the wheel 113.

Mounted upon the spindle 114 is a cam plate 117 slotted at 118 to receive the spindle 114. Each end of this cam plate is provided with a lug 119 formed with inclined inner faces 120.

A roller 121 mounted upon the face of the toothed wheel 113 is adapted to engage with the inclined faces 120 of the cam plate 118 on the rotation of the toothed wheel 113. This causes the plate to slide or oscillate backward and forward upon the spindle 114, the outer end of the cam plate being provided with a bent arm 122 engaging a projection 123 of a hollow chamber or dome 124, having a guide 125 mounted thereon. This chamber or dome 124 slides backward and forward according to the motion of the cam plate upon a chamber 126 formed upon the outer end of the bracket 102. This chamber 126 is divided into two compartments by a partition 127 and is formed with slots 128 and 129 on its upper face upon which the chamber 124 is reciprocated. The lower end of one of these compartments is fitted with a nozzle communicating by means of the pipe 129ª with the vacuum reservoir 2 while the orifice 130ª of the other compartment communicates by means of the pipe 101 with the lower compartment 90 of the milk receiver.

One compartment of the chamber 126 is always in vacuum while the other compartment is alternately in vacuum and air according to the motion of the intermittent gear above described.

The motion of this intermittent gear 7 is as follows:—The eccentric 108 on the driven shaft 104 gears by means of the pin 115 with the toothed wheel 113 the curved groove 112 in the cam sleeve 111 allowing sufficient clearance to prevent the cam coming into contact with the toothed wheel or spider 113 when the latter is rotated and the sleeve at other times coöperating with the ends of the teeth of the spider to hold the same from rotation and said wheel 113, by means of the roller 121 eccentrically mounted thereon, gears alternately with the inclined faces 120 at each end of the cam plate 118 and on contact therewith draws the chamber 124 over and away from the orifice 129 in the chamber 126, causing the vacuum in the lower compartment 90 of the milk receiver to be intermittently broken down and so allow the milk to flow into a suitable receptacle.

In order to prevent the milk gases or deleterious fumes returning from the vacuum reservoir 2 to the milk pipes, vacuum pipes and teat cups of the machine, and so cause deterioration, a valve 130 is positioned within the tubes 9 and 20. These valves are adapted to open when the air is drawn into the vacuum reservoir 2, and returns to its normal position by their own weight. The valve 130 rests upon a seat 131 within the pipes 9 and 20 and the valve rod works within a guide bar 132 as illustrated in Fig. 19. The valve therefore allows the fumes or vapors to pass into the vacuum reservoir but prevents their return to the pipes as will be readily understood.

In operation, the milk, when drawn from the teat, passes through the milk pipe of the cups either to the main milk tube or to the milk weighing and measuring device 5. In the latter case when the milking of the cow is finished, the disk 80 is actuated a quarter turn and the tube 75 is correspondingly moved while the orifice 77 comes into line with the orifice 85 of the lower sleeve 79. The vacuum draws the milk from the measuring device into the milk pipe and thence into the upper compartment of the milk receiver, the upper flap valve of which, when the lower compartment is in vacuum, opens and allows the milk to pass into the lower compartment, while on the next intermittent motion of the device 7, a reverse action takes place, the upper flap valve closing and allowing the milk to flow away through the lower flap valve into a receptacle placed ready to receive it.

The pulsator 3 is actuated from the counter shaft 30 as above described and imparts an intermittent air supply to the outer chamber of the teat cups, thus causing an intermittent squeezing action on the teats.

As each cow is milked the quantity given is indicated by the gage 71 and the weight thereof is shown by the spring balance 73, the milk yield of each cow being thereby effectually determined.

Having now particularly described and ascertained the nature of my said invention and in what manner the same is to be performed, I declare that what I claim is—

1. A milking machine consisting in the combination of a vacuum pump, a vacuum reservoir, a claw, teat cups carried by said claw, a pulsator communicating with said claw, a milk weighing and measuring device suspended above each set of teat cups, a main vacuum pipe, a main milk pipe and a milk receiver, having upper and lower compartments, a milk inlet and a vacuum connection to said upper compartment, a connection from the main vacuum pipe to said lower compartment, gearing adapted to intermittently break down the vacuum in the lower compartment of the said receiver substantially as described and as illustrated in the drawings.

2. In a milking machine the combination with a vacuum pump, a vacuum reservoir, main vacuum and milk pipes, a claw, teat cups carried by said claw, a pulsator communicating with said claw and main vacuum and milk pipes, of a milk receiver divided into upper and lower compartments, a milk inlet connection and a vacuum connection to said upper compartment, a milk discharge valve in said lower compartment, and means whereby the delivery of the milk from the said lower compartment is controlled by an intermittent supply of air and vacuum to the said lower compartment.

3. In a milking machine, the combination of a milk receiver divided into upper and lower compartments, a delivery orifice between said upper and said lower compartments, a delivery orifice from said lower compartment, flap valves controlling said delivery orifices, a milk inlet connection and a vacuum connection to said upper compartment, and means for applying and intermittently breaking down a vacuum in the lower compartment substantially as described.

4. In a milking machine, a milk receiver divided into upper and lower compartments, a delivery orifice being located between said upper and lower compartments and a delivery orifice being provided leading from said lower compartment, a milk inlet connection and a vacuum connection to the upper compartment, the upper compartment being in constant vacuum, an upper flap valve controlling the delivery orifice between the upper and lower compartments, and a lower flap valve controlling the discharge from the delivery orifice in the lower compartment, means for applying and intermittently breaking down a vacuum in said lower compartment, the said upper flap valve being open and the said lower flap valve closed when the lower compartment is in vacuum, while the upper flap valve is closed and the lower flap valve opened when the vacuum in the lower compartment is broken down substantially as described.

5. In a milking machine, a milk measuring and weighing device consisting of a container, means for applying a constant vacuum to said container, a weight indicating device from which the said container is suspended and a regulator centrally mounted within said container controlling the withdrawal of milk therefrom substantially as described.

6. In a milking machine, the combination of a spring balance, teat cups, a milk measuring and weighing device suspended from the said spring balance and located above and in communication with the said teat cups, said device comprising a gage or indicator and valve mechanism for withdrawing the milk therefrom substantially as described.

7. In a milking machine, a milk measuring and weighing device consisting of a container, a milk inlet connection in the upper part of said container and a milk delivery connection at the upper end of the said container, a regulator controlling the withdrawal of milk from the said container said regulator consisting of a vertical tube or pipe arranged centrally within the container and provided with orifices or ports at either end, the lower end of said pipe or tube being closed and provided with means for rotating or partially rotating the same, sleeves projecting within either end of said container and around the ends of the rotating tubes or pipe, the upper sleeve being in communication with said delivery connection, said sleeves being formed with orifices or ports corresponding to the orifices in the rotating tube, said tube being adapted to alternately open and close the orifices in the said sleeves substantially as described and as illustrated in the drawings.

8. In a milking machine, a pulsator provided with two compartments, each formed with an orifice or slot, a connecting rod controlling the movement of the pulsator, a bridge or guide arranged above and adapted to engage the pulsator dome and mounted upon the said connecting rod, a threaded sleeve formed at one end of said bridge or guide, a similar sleeve affixed to said connecting rod, and a sleeve nut connecting said sleeves, said dome being adapted to always cover the orifices of one compartment and to alternately open and close the orifices of the other compartments of the pulsator substantially as described and as illustrated in the drawings.

9. In a milking machine a pulsator having a connection to a vacuum pump and a connection to the claw carrying the teat cups and comprising a double chamber each part of which is formed with an orifice or slot, a dome adapted to be reciprocated across the face thereof, a driven eccentric wheel, a connecting rod fitted to said eccentric wheel, a bridge piece controlling the movement of said dome and loosely mounted upon the said rod, a threaded sleeve or collar formed on the bridge, a similar sleeve fitted to said connecting rod, and a sleeve nut engaging said bridge sleeve and said connecting rod sleeve, the sleeve nut being thereby adapted to adjust the position of said bridge and therefore the degree of pulsation on the teat substantially as described and as illustrated in the drawings.

10. In a milking machine, means for imparting an intermittent supply of air to a milk receiver comprising a driven spindle, a toothed wheel or spider, a slotted plate, a dome valve, a vacuum and air receiver, an eccentric and cam mounted on said spindle and adapted to operate said toothed wheel or spider, said toothed wheel being adapted in turn to impart a reciprocating motion to said slotted plate said slotted plate being attached to said dome valve which is slidably mounted upon the face of said vacuum and air receiver, said vacuum and air receiver being divided into two compartments communicating with the vacuum supply and the milk receiver respectively, and provided with slots on their face, substantially as and for the purposes set forth.

11. In a milking machine the combination with a claw, a vacuum connection to said claw, a milk pipe leading to said claw, and teat cups carried by said claw, of means for automatically stopping the milking operation on the falling of a teat cup comprising a valve in said milk pipe, and a flexible connection between said teat cups and said valve, controlling said valve.

12. In a milking machine the combination with a vacuum pump, a vacuum reservoir, a main vacuum pipe, a main milk pipe, and pipe connections between the said main vacuum pipe and said reservoir and between the said main milk pipe and the said vacuum reservoir, of means for preventing the return from the said vacuum reservoir of the milk fumes or vapors to the main milk pipe and main vacuum pipe comprising a valve positioned in each of the said pipe connections.

In testimony whereof I affix my signature in presence of two witnesses.

EDWARD CAMERON.

Witnesses:
   SIDNEY HENDLEY,
   ANNIE EDWARDS.